Figure 1:
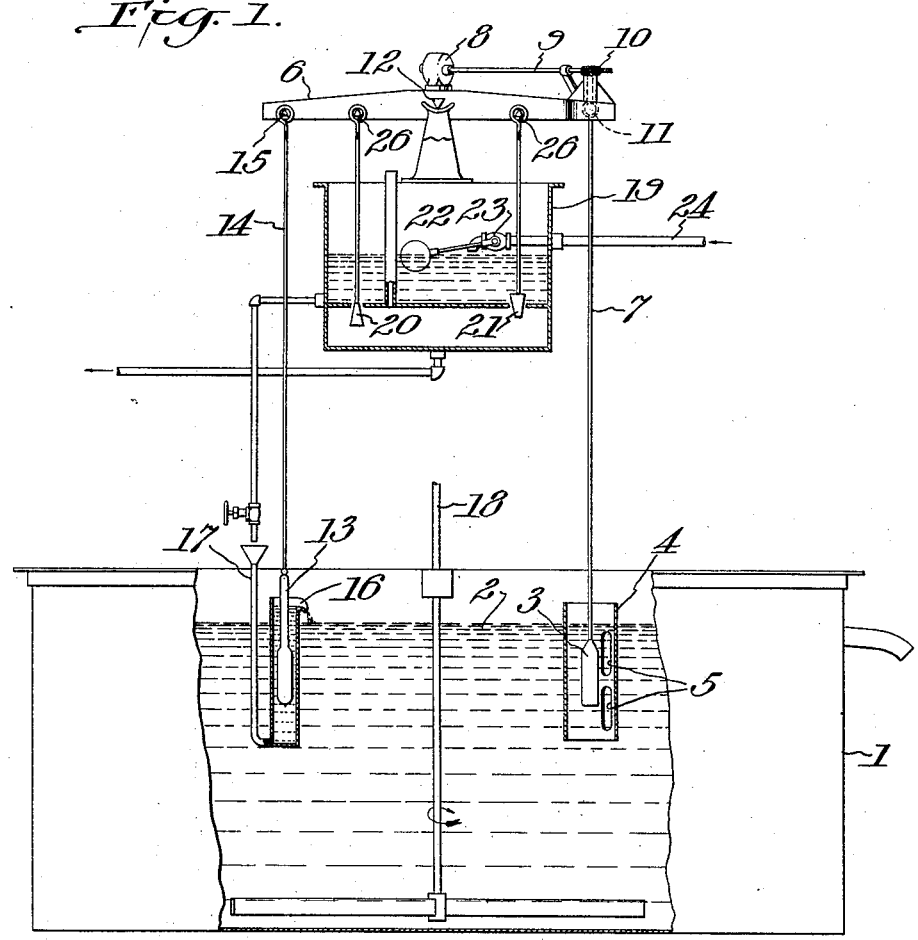

Jan. 3, 1933.  H. HOWARD  1,892,839
MEANS FOR MEASURING AND CONTROLLING THE DENSITY
OF SUSPENSIONS OF SOLIDS IN LIQUIDS
Filed Feb. 16, 1931

Inventor:
Henry Howard
By Byrnes, Townsend & Potter
Attorneys.

Patented Jan. 3, 1933

1,892,839

UNITED STATES PATENT OFFICE

HENRY HOWARD, OF NEWPORT, RHODE ISLAND

MEANS FOR MEASURING AND CONTROLLING THE DENSITY OF SUSPENSIONS OF SOLIDS IN LIQUIDS

Application filed February 16, 1931. Serial No. 516,270.

The present invention relates to means for measuring and/or controlling the density of suspensions of solids in liquids.

In many cases in the process industries the close control of the concentration of solids in a slurry is of the greatest importance. This occurs for example whenever the solids in the slurry must be added to other materials in exactly combining proportions. An automatic feeder passing an exactly controlled quantity of slurry into the process would be of little use unless the solid content of the slurry itself were controlled with similar exactness.

The float-actuated devices hitherto proposed for controlling and measuring the density of solid suspensions suffer from certain serious disadvantages. Due to the viscosity of the slurries they are very sluggish and uncertain in their action. Moreover serious errors of unpredictable amount are entailed by the settling or coating of the solids upon the float member.

One object of the invention is to provide a density controlling or measuring means for solid suspensions such as slurries and the like, which will quickly respond to changes in density. Another object is to provide a density controlling or measuring means for slurries in which errors due to the settling or coating of the solids on the density sensitive element of the device are largely eliminated.

I have found that these objects may be accomplished by giving to the float member of a float-actuated device a rotary motion, which may either be continuous or oscillating. Because of the rotary motion the float member responds much more quickly to changes in density and the deposition of solid particles on its surfaces is prevented. It is preferred that the float member be of fusiform shape whereby the advantages of the rotary motion are enhanced.

The float member may be connected so as to actuate any form of control device such as a valve, and it may likewise actuate any form of indicating and/or recording device. Inasmuch as the ultimate end of indicating and recording devices as used in the process industries is the control of conditions the term "control-effectuating mechanism" will be broadly used herein to include such indicating and recording devices.

In some processes the liquid in which the solids are suspended may be a solution, for example a salt solution, the concentration of which may change. The temperature of the suspension medium may also be subject to change. Therefore in the preferred embodiment of my invention I contemplate the provision of means whereby such changes in the concentration and temperature of the suspension medium may be compensated.

Such compensation for the variation in density of the suspension medium may be provided, for example, by immersing a float, so connected with the principal float as to counteract its buoyancy, in a portion of the clear suspension liquid as, for instance, in a section of the conduit conveying the liquid to the apparatus wherein the desired slurry is to be formed. The compensation for variation in temperature may be effected by immersing the container, in which the compensating float is immersed, in the body or stream of the slurry.

Figure 2:
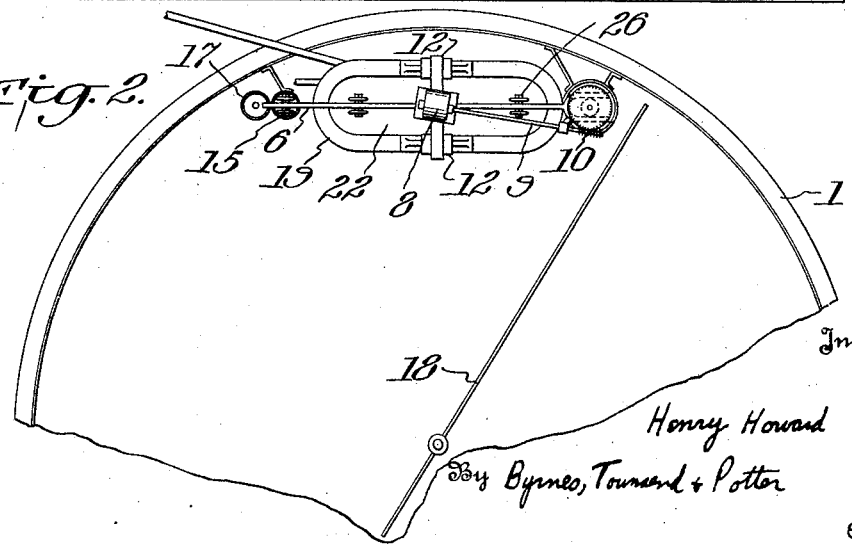

The invention will be described for the purpose of illustration with particular reference to the accompanying drawing of which Fig. 1 is an elevation in partial section of one embodiment of the invention; and Fig. 2 is a plan of a detail of the device shown in Fig. 1.

In the figures, 1 represents a tank wherein a slurry 2 is to be diluted to a desired solid content. A fusiform float 3 is suspended in the slurry within a well 4 provided with lateral slots 5. The float 3 is flexibly connected to beam 6, by means of a rod 7. The suspending means 7 is rotated by means of a motor 8 connected with the suspending means by shaft 9, gearing 10 and universal joint 11. The motor may, of course, be mounted on the beam 6 either at its center as shown or directly over the float, or it may be mounted adjacent the center of the beam and connected with the float rod by a suitable transmission system.

The beam 6 is pivoted on knife edges at 12.

From the end of the beam opposite the point of attachment of the above described float 3, a second float 13, which may be designated as the compensating float, is suspended by means of a rod 14, upon knife edges 15. The compensating float 13 is immersed in a well 16 connected at its lower end with a conduit 17 leading to a source of supply of the diluent liquid. The liquid passing through the well overflows into the tank 1.

The tank is provided with agitating means 18.

It will be seen that the movements of the beam 6 will be proportional to the resultant of the buoyant forces acting upon floats 3 and 13, and that since the buoyant effect of the clear diluent liquor at its actual temperature and concentration will be exerted alike upon both of the floats, while the effect of the buoyancy of the suspended solids will operate only on float 3, therefore the buoyant force effective to move beam 6 will result solely from the effect of the suspended solid mater on the density of the slurry.

In the device shown in the drawing the movement of beam 6 is utilized to actuate a balanced valve device 19, such as that described in my United States Patent No. 509,664 of November 28, 1893. This valve, which is inserted in the line supplying the diluent liquid, consists of two interconnected valves 20 and 21 operating to control the outflow from a chamber 22 wherein liquid is maintained at a substantially constant level by means of a float valve 23, connected by pipe 24 to a source of supply. The valves 20 and 21 are attached by knife edges 25 and 26 to beam 6.

It will be seen that by choosing float members of suitable buoyancy, and by properly adjusting the dimensions of the system, the device will operate to shut off the flow of diluting liquid into the dilution vessel when the dilution of the slurry in tank 1 has proceeded to any predetermined extent.

By virtue of the rotating motion of the float member 3 which is directly immersed in the slurry, the response to changes in density will be prompt and accurate, since the rotating motion reduces both the lag due to the viscous friction of the slurry and the error due to the settling or coating of solid material on the float member. As has been previously stated the valve mechanism 15 may be replaced by, or supplemented with, any desired controlling, indicating, recording or signalling device.

The rotary motion of the float member may of course be effected in other ways than that shown in the drawing. For example, an air- or steam-actuated turbine or similar device may be directly mounted on the suspension member 7.

I claim:

1. A float-actuated device for effectuating the control of the density of slurries and the like, comprising a float member, means for rotating said float member, and a control-effectuating mechanism actuated by the movement of said float member.

2. A float-actuated device for effectuating the control of the density of slurries and the like, comprising a fulsiform float member, means for rotating said float member, and a control-effectuating mechanism actuated by the movement of said float member.

3. A float-actuated device for effectuating the control of the density of slurries and the like, comprising a float member suspended in the slurry, an auxiliary float member suspended in the liquid medium of said slurry and counterbalancing said first mentioned float member through a connecting member from which both of said floats are suspended, and effectuating the control of mechanism actuated by the movement of said float member.

4. A float-actuated device for effectuating the control of the density of slurries and the like, comprising a float member suspended in the slurry, means for rotating said float member, an auxiliary float member suspended in the liquid medium of said slurry and counterbalancing said first mentioned float member through a connecting member from which both of said floats are suspended, and effectuating the control of mechanism actuated by the movement of said float member.

5. A device for controlling the density of slurries and the like comprising a float member suspended in the slurry, means for rotating said float member, and a valve, actuated by the movement of said float member and adapted to control the flow of liquid to the slurry.

6. A device for controlling the density of slurries and the like comprising a float member suspended in the slurry, an auxiliary float member suspended in the liquid medium of said slurry and counterbalancing said first mentioned float member through a connecting member from which both of said floats are suspended, and a valve, actuated by the movement of said float member and adapted to control the flow of liquid to the slurry.

7. A device for controlling the density of slurries and the like comprising a float member suspended in the slurry, means for rotating said float member, an auxiliary float member suspended in the liquid medium of said slurry and counterbalancing said first mentioned float member through a connecting member from which both of said floats are suspended, and a valve, actuated by the movement of said float member and adapted to control the flow of liquid to the slurry.

In testimony whereof, I affix my signature.

HENRY HOWARD.